(12) United States Patent
An et al.

(10) Patent No.: US 9,025,001 B2
(45) Date of Patent: May 5, 2015

(54) APPARATUS AND METHOD TO SWITCH A VIDEO CALL TO AN AUDIO CALL

(71) Applicant: Honeywell International Inc., Morristown, NJ (US)

(72) Inventors: Adamas An, Shanghai (CN); ZhongWei Ding, Shanghai (CN); Guoying Wang, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 106 days.

(21) Appl. No.: 13/793,154

(22) Filed: Mar. 11, 2013

(65) Prior Publication Data
US 2014/0253664 A1 Sep. 11, 2014

(51) Int. Cl.
H04N 7/14 (2006.01)

(52) U.S. Cl.
CPC ..................................... *H04N 7/147* (2013.01)

(58) Field of Classification Search
CPC ......... H04N 7/15; H04N 7/147; H04N 7/152; H04N 7/141; H04N 7/14
USPC ...................... 348/14.01, 14.08, 14.11, 14.12
See application file for complete search history.

(56) References Cited

U.S. PATENT DOCUMENTS

| 8,760,492 B2* | 6/2014 | Halavy et al. ............... 348/14.09 |
| 2010/0053301 A1* | 3/2010 | Ryu et al. .................... 348/14.02 |
| 2011/0141220 A1* | 6/2011 | Miura ......................... 348/14.02 |
| 2013/0202095 A1* | 8/2013 | Jones et al. ................. 379/32.01 |

* cited by examiner

*Primary Examiner* — Quoc D Tran
(74) *Attorney, Agent, or Firm* — Husch Blackwell LLP

(57) ABSTRACT

An apparatus and method to control transmission of a sequence of a video call or communication. An individual participating in a video call or communication can shade a video input port of a camera to switch from a video call or communication to an audio only call or communication. A control element can be provided to reinstate transmission of the video component of the call or communication.

19 Claims, 4 Drawing Sheets

APPARATUS AND METHOD TO SWITCH A VIDEO CALL TO AN AUDIO CALL

FIELD

The application pertains to apparatus and methods to switch from a video call to an audio call while communications are on-going. More particularly, the application pertains to such apparatus and methods which enable a user to quickly and easily suppress the video portion of the call while continuing the audio portion.

BACKGROUND

Security monitoring systems usually include a control panel which has a visual display, manual controls and might include a video security CMOS or CCD camera directed to a location in front of the control panel. Such cameras are useful for security purposes as they make it possible to view from a displaced location, or record, individuals approaching the panel. Additionally, they provide a communications path for an individual at the panel to initiate and carry on an audio, or, a video call to a displaced location. Other types of wireless devices, such as smart phones, lap top computers or the like can provide a similar function.

DETAILED DESCRIPTION

Figure 1:
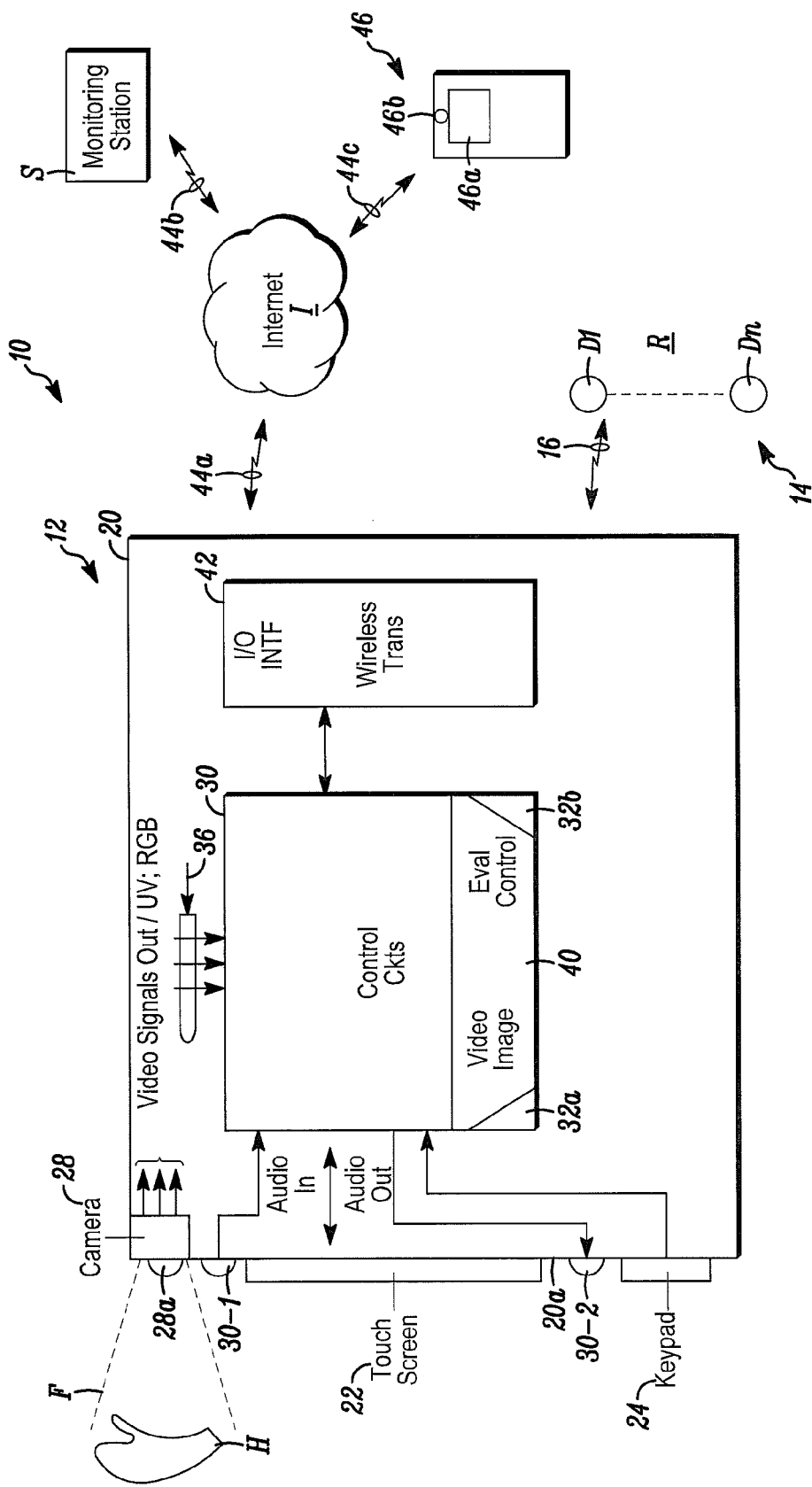
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, an apparatus and methods are provided to switch a video call to an audio call by making a predetermined type of motion. It is particularly advantageous as the process is readily understandable, easily visualized and convenient. Applicable devices which can incorporate the present functionality include smart phones, lap top computers, tablet computers, computer based control systems, all without limitation.

A user involved in a video call can convert to an audio call merely by shading a camera's input. Moving a hand in front of the camera will cause a relative abrupt drop in a luminance parameter of the output video from the camera. Alternately, a smart phone or PDA could be temporarily held against a user's clothing. This parameter change, or drop, can be sensed and used to switch a video call to an audio call.

This process reflects a natural action of a user who wants to cease a video call but not terminate the communications. It is also quick and easy to carry out.

In one embodiment, a computer, tablet, smart phone or control panel, for example a security monitoring control panel, can be equipped with a video camera and audio input/output devices. Feed from the camera can be monitored by local circuitry.

More particularly, where the camera emits YUV, or Y'UV formatted video signals, the Y, or Y' component is associated with luma, or brightness of the signal. Circuitry in accordance herewith monitors this parameter, and converts from a video call to an audio call only in response to a predetermined change in this parameter.

Camera output is not a limitation hereof. For example, RGB output cameras can be similarly controlled by converting the R, G and B outputs to an equivalent value of luma, Y or Y'.

Once the call has been switched from a video to an audio call, a light button can be provided on a respective display device to switch the system back to a video mode. Alternately, a keypad can provide similar functionality.

In accordance herewith, a user merely has to initiate a video call, and if at some point during the call, the user wants to convert to only an audio call, the user need only move his/her hand in front of the camera, shading it, thereby causing a change in the Y, or Y' component. This detected change can be used by internal, local circuitry and/or control software, to terminate the video portion of the call, while allowing the audio portion to continue.

In another aspect, only outgoing video will be suppressed. In this embodiment, the local user can continue to receive video from the other party while transmitting only audio.

FIG. 1 illustrates an apparatus 10 in accordance herewith. For exemplary purposes, apparatus 10 includes a system to monitor a plurality of conditions in a region R. Other devices which can include the below described functionality can include, without limitation, smart phones, lap top computers, tablet computers, or PDA type devices.

Apparatus 10 includes, a monitoring control panel 12 which, for example, is in wired or wireless communication with a plurality of condition detectors 14 installed in the region R. The detectors Di from the plurality 14 can include door or window monitoring detectors, intrusion detectors, gas, fire or smoke detectors all without limitation, via a medium 16. The system 10 can communicate wirelessly via the Internet I with a displaced monitoring station S.

Monitoring panel 12 can include a housing 20. Housing 20 can carry a touch screen for input/output communications, such as screen 22 and an associated keypad 24. A real-time security camera 28 can be carried by the housing 20. Camera 28 can be mounted on a front panel, such as 20a of housing 20 with a field of view that includes a space or region in the immediate vicinity of the front panel 20a. In this regard, control unit 12 can include control circuits 30, which could be implemented, at least in part by a programmable processor 32a and associated executable software 32b.

Unit 20 can also include a microphone 30-1 for audio input, and a speaker 30-2 for audio output. System 10 can communicate wirelessly using local wireless transceiver 42. It will be understood that neither the details of the transceiver 42 nor of the wireless communication protocol, via media 44a, 44b or 44c are limitations hereof.

As will be understood by those of skill in the art, the control unit 12 can wirelessly connect a user in the field of view F of camera 28, via a wireless, video communication link, an associated audio link and the Internet I, to another party, another computer or the like, for example phone or pad computer 46, for an audio and video communication or call. An image of the user at the control unit 12, transmitted via camera 28 can be presented during this call on a display 46a of the communication device 46 along with associated real-time audio.

An image generated at the unit 46 along with associated audio can be presented on display unit 22 and output via speaker 30-2.

Video signals, generally indicated at 36, can be fed or coupled to control circuits 30 to implement the desired outgoing video portion of the call or communication. The specific output from the camera 28, for example CCD or CMOS, is not a limitation hereof. An intensity or luma parameter of the signals 36 can be continually monitored by video evaluation and image control circuits 40 while the call or communication is on-going. This process could be implemented by processor 32a executing instructions 32b.

In the event that a user waves a hand H in front of, or over the optical input port, indicated at 28a of camera 28, the intensity or luma parameter will change value relatively abruptly. This change can be detected by image control circuits, and/or software 40.

In response to the detected change of intensity, the circuits 40 can terminate the outgoing video portion of the call or communication while maintaining the audio portion, along with any incoming video if desired. As discussed subsequently, the control circuits 30 can output a touch sensitive control or light button on the touch screen display 22. This control or light button can be used to reinstate the outgoing video portion of the call or communication. Alternately, a user can use a key or combination of keys from keypad 24 to enter the video restoring command.

Figure 2A:
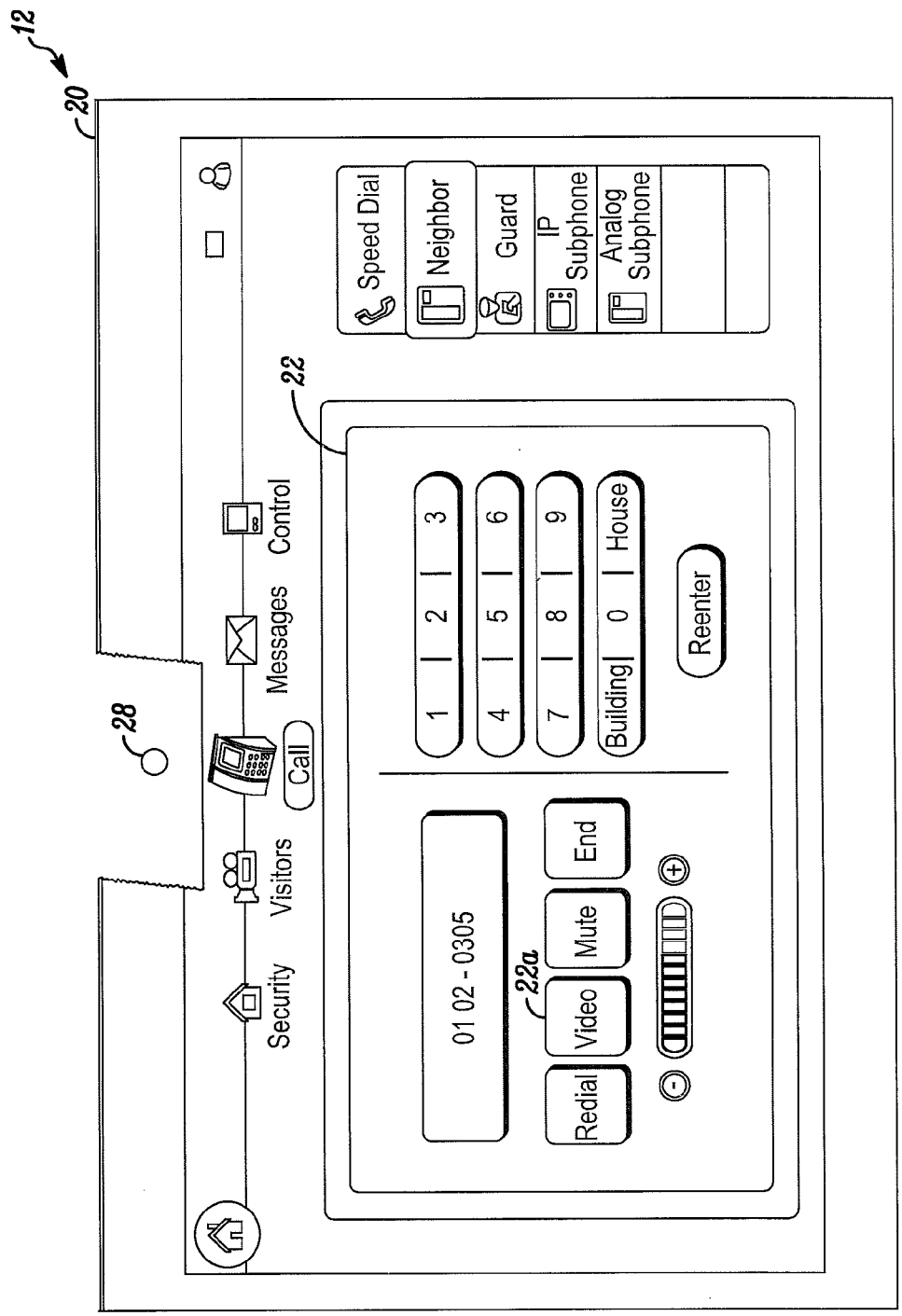
FIGS. 2A-2C illustrate a control method in accordance herewith.
Figure 2B:
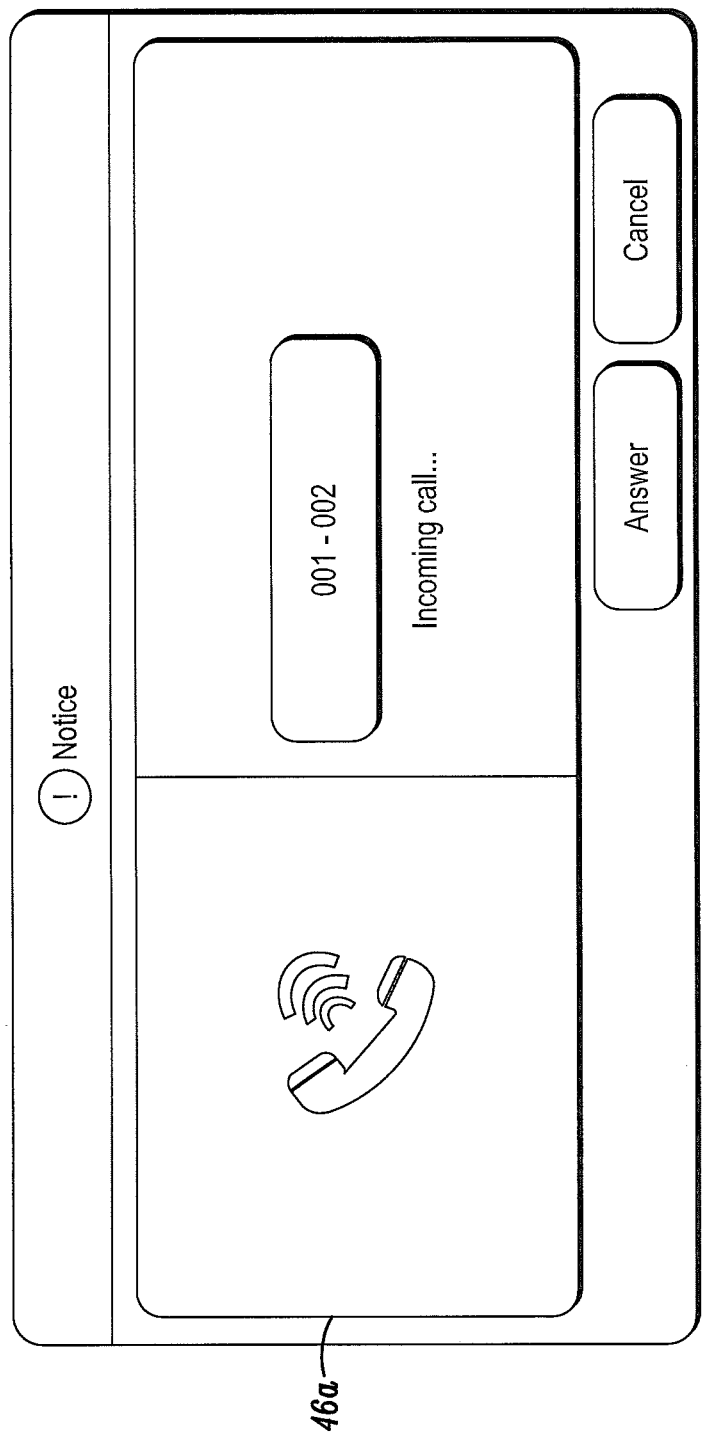
Figure 2C:
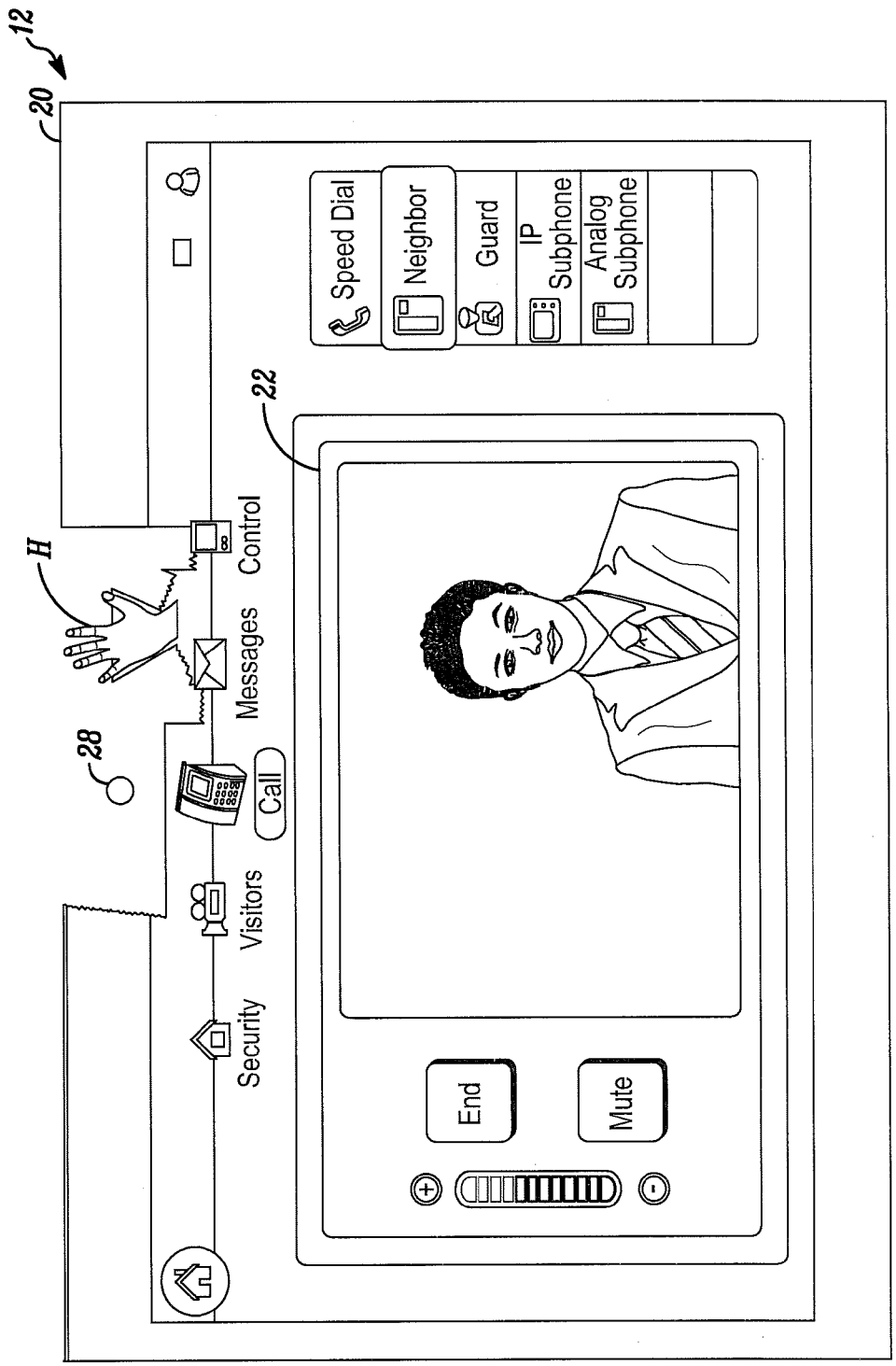

FIGS. 2A-2C illustrate additional aspects of the process. FIG. 2A, illustrates the control panel 12 supporting a calling page. When the user successfully dials a call, to unit 46, for example, an incoming call page, as in FIG. 2B can be presented at the recipient's display, such as 46a. When the called party answers, a calling page as in FIG. 2A can be presented. If the "video" button 22a is activated, two way video can be presented as on the screen of FIG. 2C.

As illustrated in FIG. 2C, to terminate the outgoing video portion of the call or communication the user need only wave a hand H in front of the input port 28a of the camera 28, otherwise temporarily cover it over. In one aspect, presentation of the user's outgoing image to the display 46a is immediately terminated, while the audio continues. The image from the unit 46, being presented on the screen 22 can be continued or terminated.

The screen 22 can then present the call page with video button 22a to provide a vehicle for reinitiating the outgoing video portion of the communication. This button can also be presented while incoming video from camera 46b is being presented.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows, depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
   a system that monitors a plurality of conditions within a region via a monitoring control panel in wired or wireless communication with at least a fire detector installed in the region;
   a video camera carried by the monitoring control panel with associated circuitry that generates a stream of video data indicative of an object in a field of view of the camera, wherein the data stream exhibits at least one parameter relating to the sensed object;
   control circuits that establish at least a video communications path; and
   evaluation circuits which sense the parameter, and responsive to detecting a predetermined user shading of the camera, terminate transmission of the outgoing video wherein the predetermined user shading of the camera reflects a natural action and movement of a user who wants to cease a video call but not terminate the communications.

2. An apparatus as in claim 1 wherein the camera is installed in one of a housing for a programmable computer, a smart phone, a pad computer, or a processor controlled system.

3. An apparatus as in claim 2 where the processor controlled system comprises a programmable processor with the evaluation circuits coupled to the video data stream and the processor; and
   including a visual display which presents a control element to switch from audio only to an audio/video link.

4. An apparatus as in claim 1 wherein the measurable parameter comprises an indicium of luma of the video signal.

5. An apparatus as in claim 1 which includes a microphone and speaker coupled to the control circuits.

6. An apparatus as in claim 5 including a housing which carries a visual display along with the microphone and speaker wherein an audio/video call or communication can be established with a displaced unit.

7. A monitoring system comprising:
   a plurality of condition detectors that monitor a plurality of conditions in a region including at least a fire detector installed in the region;
   a user operable control panel which includes, a microphone and speaker, the user operable control panel in wired or wireless communication with the plurality of condition detectors;
   a video camera with associated circuitry carried by the user operable control panel that generates a stream of outgoing video signals indicative of an object in a field of view of the camera, wherein the data stream exhibits at least one parameter relating to the sensed object;
   control circuits that establish at least an outgoing video communications path wherein the control circuits are coupled to the microphone and speaker along with the video camera; and
   evaluation circuits which sense the parameter, and responsive to detecting a predetermined user shading of the camera, terminate transmission of the outgoing video wherein the predetermined user shading of the camera reflects a natural action and movement of a user who wants to cease a video call but not terminate the communications.

8. A monitoring system as in claim 7 which includes a plurality of condition indicating detectors which can be in wireless communication with the control panel.

9. A monitoring system as in claim 8 wherein the control panel is Internet enabled and can establish bidirectional audio/video communications with a displaced unit wherein the outgoing video signals can be transmitted thereto along with associated audio and wherein the shading terminates the outgoing video signals and continues to transmit the audio to the displaced unit.

10. A method comprising:
    a system monitoring a plurality of conditions in a region;

a monitoring control panel of the system in wireless communication with the plurality of condition detectors installed in the region including at least a fire detector;

a camera of the monitoring control panel establishing a least a video communications link;

measuring a parameter of an on-going video communication, the measured parameter reflecting a natural action and movement of a user who wants to cease a video call but not terminate the communications;

evaluating the measured parameter relative to a predetermined condition; and responsive to the evaluation, altering a characteristic of the communications link.

11. A method as in claim 10 which includes, providing a video camera.

12. A method as in claim 11 which includes providing a medium for the link and transmitting the communication, via the link, to a displaced recipient.

13. A method as in claim 11 where altering comprises switching from an audio/visual communication to only an audio communication.

14. A method as in claim 13 which includes providing a control element associated with the communications link, the control element establishing an audio outgoing link and a video outgoing link.

15. A method as in claim 14 which includes using the control element to reset the condition of the communications link.

16. A method as in claim 15 which includes presenting on a local display device, one of a local user, or video from a camera on a displaced communications unit.

17. A method as in claim 16 wherein the parameter is directly related to brightness of a video signal.

18. A method as in claim 17 which includes establishing a brightness indicium and comparing that indicium to a predetermined value.

19. A method as in claim 10 where a change in the indicium terminates transmitting the video portion of the communication.

* * * * *